United States Patent [19]

Murata

[11] Patent Number: 5,017,956
[45] Date of Patent: May 21, 1991

[54] FLASH PHOTOGRAPHY SYSTEM

[75] Inventor: Yoshitaka Murata, Kanagawa, Japan

[73] Assignee: Canon Kabushiki Kaisha, Tokyo, Japan

[21] Appl. No.: 297,438

[22] Filed: Jan. 17, 1989

[30] Foreign Application Priority Data

| Jan. 18, 1988 | [JP] | Japan | 63-007895 |
| Jan. 18, 1988 | [JP] | Japan | 63-007896 |
| Jan. 18, 1988 | [JP] | Japan | 63-007897 |
| Jan. 18, 1988 | [JP] | Japan | 63-007898 |
| Jan. 18, 1988 | [JP] | Japan | 63-007899 |

[51] Int. Cl.⁵ .......................... G03B 7/00; G03B 15/05
[52] U.S. Cl. ..................................... 354/416; 354/421; 354/127.1
[58] Field of Search ............... 354/421, 413, 416, 417, 354/402, 145.1, 424, 127.1, 127.13, 442

[56] References Cited

U.S. PATENT DOCUMENTS 4,494,850 1/1985 Katsuma et al. .................... 354/416

Primary Examiner—L. T. Hix
Assistant Examiner—Cassandra C. Spyrou
Attorney, Agent, or Firm—Fitzpatrick, Cella, Harper & Scinto

[57] ABSTRACT

A flash photography system of the kind performing a flash adjusting action in a mode of adjusting an aperture value, a guide number, etc. according to a distance to an object to be photographed is arranged to allow the flash adjusting action to be performed in the above-stated mode only when a combination of the object distance detected by an automatic focusing device and the focal length currently set shows a given value. If the combination fails to show the given value, the system either has the flash adjusting action performed in a manner which differs from the above-stated mode or allows the flash adjusting action to be performed in the above-stated mode by changing the focal length of a phototaking lens.

11 Claims, 15 Drawing Sheets

FLASH PHOTOGRAPHY SYSTEM

BACKGROUND OF THE INVENTION

1. Field of the Invention

This invention relates to a control system for a flash device of a camera.

2. Description of the Related Art

The known flash adjusting methods heretofore employed for flash devices of cameras of the kind using a silver-halide film include an external-metering flash adjusting method and a TTL flash adjusting method.

In accordance with the external-metering flash adjusting method, the flash device is arranged as follows: The flash device is provided with an external-metering flash adjustment sensor. Light reflected from an object to be photographed as a result of flash light emission by the flash device is received and temporally integrated by the external-metering flash adjustment sensor. When an integrated value of the reflected light reaches an apposite light quantity which is determined according to a film speed and an aperture value of the camera which have previously input to the flash device, the flash light emission by the flash device is brought to a stop. It is an advantage of this method that the flash adjustment can be carried out without having any additional device arranged within the camera for that purpose. However, this method has the following disadvantages: There arises some parallax between a photo-taking lens of the camera and the flash device. Since a light receiving angle of the external-metering flash adjustment sensor is fixed, it is impossible to cope with a change in the angle of view. There is a great influence of a background of the object. In accordance with this method, therefore, it is difficult to make the flash adjustment with a high degree of accuracy.

In the case of the TTL flash adjusting method, an image of the object which is obtained by illuminating the object with a flash device and which is projected on the surface of film is measured in light by means of a light receiving element which is disposed within the camera. The flash light emission by the flash device is brought to a stop when the quantity of light received by the light receiving element reaches an apposite level which is preset at the flash device on the basis of a film speed and an aperture value of the camera. This method permits the flash adjustment to cope with a change in the angle of view without being affected by any parallax. The flash adjustment thus can be carried out with a high degree of accuracy. Therefore, in these days, the TTL flash adjusting method is most popularly employed for a single-lens reflex camera. However, a shortcoming of that method lies in that: Since light reflected from the film surface which is very weak is to be measured, a difference in reflection factor among different film products and the influence of a background of the object which varies depending on the position and the size of the object tend to result in a flash adjustment error.

In addition to the above-stated external-metering flash adjusting method and the TTL flash adjusting method, there has been known another flash adjusting method which is the most fundamental method and which is called a flashmatic method. The flashmatic method (hereinafter referred to as DV (distance value) flash adjusting method) is as follows: An aperture value is determined for the camera by dividing the guide number (GNO.) of the flash device by information on a distance to the object which is obtained either from the flash device or from the camera. After that, the flash device is allowed to emit a flash light for an apposite exposure.

The DV flash adjusting method permits highly accurate flash adjustment without being affected by the position, the size and the background of the object. However, in a case where the flash device is arranged to have the flash adjustment automatically carried out, the DV flash adjusting method necessitates the use of highly accurate distance measuring means with the flash adjustment arranged to be dependent on the object distance information obtained from the camera, i.e., obtained from a distance ring when the photo-taking lens is in an in-focus state, because: If the range finding (distance measuring) device of the camera is of a passive type, the result of distance measurement tends to be inaccurate in a specific condition of the object. The distance measurement error increases particularly in the event of a short focal length of the photo-taking lens. Besides, the error also increases accordingly as the shooting distance to the object increases.

Meanwhile, cameras of the kind arranged to convert an optical image of an object into an electrical signal by means of an image sensor such as a CCD or the like without using any silver-halide film (hereinafter, such a camera being referred to as an electronic still camera) have recently been developed. The accuracy of the above-stated flash adjustment must be higher for the electronic still camera than for the camera of the kind using the silver-halide film, because the image sensor which is a CCD or the like has a narrower latitude than the silver-halide film. For example, the allowable flash adjustment error in the electronic still camera is within a range of ±1 EV while that in the silver-halide film (negative film) is ±5 EV.

With such a high flash adjustment accuracy required by the electronic still camera, the TTL flash adjusting method is more suitable for the electronic still camera than the external metering flash adjusting method as the former is more accurate than the latter. Assuming that the TTL flash adjusting method is applied to the electronic still camera, light reflected from the object is receivable by one of the following two conceivable methods:

(I) A method of providing a half-reflection mirror within a photo-taking optical path and arranging a light receiving sensor to receive the object's light reflected from the half-reflection mirror; and (II) a method of receiving the light reflected from an image forming plane of the CCD by means of a light receiving sensor.

However, in the case of the method (I), the half-reflection mirror arranged within the photo-taking optical path reduces the quantity of light incident on the image forming plane of the CCD. This lowers the sensitivity of a photographing operation of camera. Further, the addition of the half-reflection mirror is a spatial disadvantage.

In accordance with the method (II), the light reflected from the CCD is very weak and available only in a small amount as the image forming plane of the CCD is provided with an anti-reflection coating or the like. This makes the flash adjustment difficult.

In a case where the external metering flash adjusting method is applied to the electronic still camera with some means for increasing the accuracy of flash adjustment, this method necessitates a parallax structural arrangement and some device for controlling a light receiving angle of the light receiving sensor. This requirement results in a complex arrangement of the flash device and thus increases the size of the flash device.

Meanwhile, adoption of the DV flash adjusting method would be disadvantageous for the electronic still camera in terms of the distance measuring accuracy because the flash adjustment must be by carried out for more accurately for the electronic still camera than for the silver-halide film camera and because a photo-taking lens of the short focal length is more likely used for the electronic still camera than for the silver-halide film camera since the angle of view of the electronic still camera is little as compared with that of the silver-halide film camera.

SUMMARY OF THE INVENTION

One aspect of the invention under the present application resides in the provision of a control system for a flash device which is, for example, applicable to an electronic still camera by virtue of the arrangement of the control system, wherein: The DV flash adjusting method is utilized as much as possible to the advantage of the system; under any photographing condition that might result in some flash adjustment error in accordance with the DV flash adjusting method, the external metering flash adjusting method is utilized; and the system is thus arranged to carry out a flash adjustment with a high degree of accuracy without lowering the photographing taking sensitivity and without causing any increase in size of the device.

It is one aspect of the invention to provide a flash photography system which is highly suited for daylight synchroflash photography, etc. The system is arranged to make a flash adjustment by the DV flash adjusting method by variably determining the guide number of the flash device according to the object distance and a set aperture value in the event of an aperture-priority mode.

It is another aspect of the invention to provide a flash photography system for a camera wherein: In a case where the AF(auto-focus) mode of the camera is in a release-priority mode, the system selects a flash adjusting method such as an external-metering flash adjusting method that does not require the use of information on a distance to an object to be photographed, so that flash photography can be adequately accomplished in the AF mode.

It is a further aspect of the invention to provide a flash photography system which is arranged as follows: In carrying out the DV flash adjusting method, if the object distance and the focal length of a photo-taking lens are not suited for the DV flash adjusting method, a warning is given to indicate the necessity for a change in the focal length; and then a DV flash adjustment range is enlarged by manually or automatically shifting the system to a state in which the DV flash adjusting method is possible.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
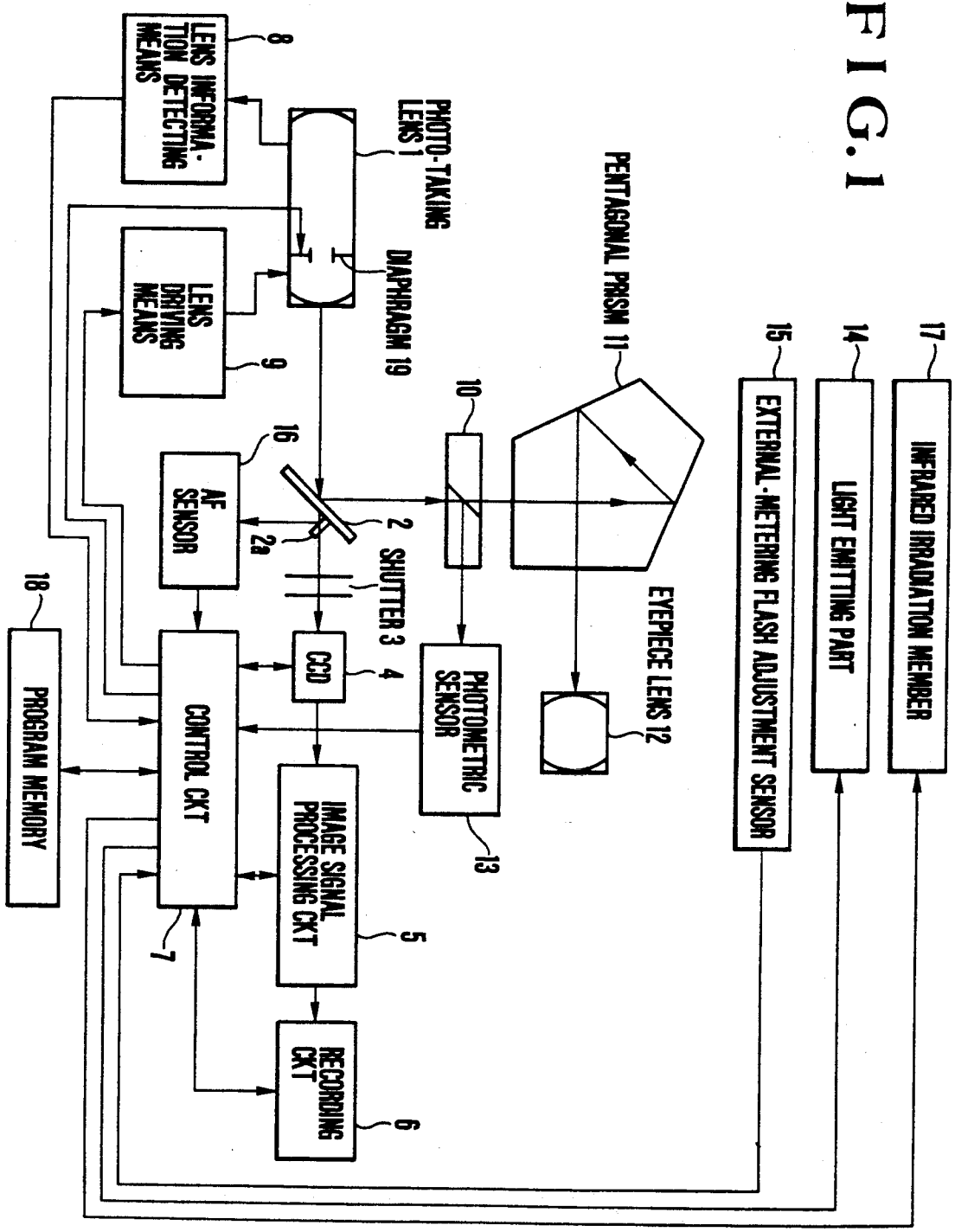
FIG. 1 is a block diagram showing the arrangement of a camera system using a flash photography system which is arranged according to the invention as an embodiment thereof.

The details of this invention will become apparent from the following description of embodiments thereof shown in the accompanying drawings, wherein:

FIG. 1 is a block diagram showing a control system for a flash device as applied to an electronic still camera. Referring to FIG. 1, the illustration includes a photo-taking lens 1; a quick-return mirror 2 which is provided with a sub-mirror 2a; a shutter 3; an image sensor 4 which is composed of a CCD; an image signal processing circuit 5; a recording circuit 6; a control circuit 7 which is arranged to control the camera and the flash device and includes a microcomputer therein; and a lens information detecting means 8 which is arranged to detect information on the object distance as obtained at a distance ring of the photo-taking lens 1, on the focal length of the lens 1, etc. The photo-taking lens 1 is a zoom lens in the case of this embodiment. The focal length of the photo-taking lens 1 is therefore variable. The focal length information is formed by means of a code plate pr the like which is arranged to operate in association with a focal length varying device. The object distance information is also formed by means of a code plate or the like which is arranged to operate in association with the above-stated distance ring. The illustration further includes a lens driving means 9 which is provided for an automatic focusing (hereinafter referred to as AF) action on the photo-taking lens 1; a half-reflection mirror 10; a pentagonal prism 11; an eyepiece lens 12; a photometric sensor 13; a light emitting part 14 of the flash device; an external-metering flash adjustment sensor 15 of the flash device; an AF sensor 16; an infrared irradiation member 17 of the flash device; a program memory 18 which stores a change-over curve for selection between a DV flash adjustment area and an external-metering flash adjustment area according to the focal length of the photo-taking lens 1 and a distance to the object; and a diaphragm 19.

When a first release switch (not shown) arranged to be responsive to the first stroke of a shutter release button is turned on, a light measuring action is performed by the photometric sensor 13 through the half-reflection mirror 10. The AF sensor 16 begins to perform a distance measuring (or range finding) action. The photo-taking lens 1 is then driven to shift its position. When a second release switch (not shown) arranged to be responsive to the second stroke of the shutter release button is turned on, the shutter 3 is driven for photographing.

The flash device control system arranged in the manner as described above performs a flash adjusting action as follows: When the first release switch is turned on in the case of flash photography, an object to be photographed is irradiated with an infrared ray by the infrared irradiation member 17. An infrared light reflected from the object then comes to pass through the phototaking lens 1. The infrared reflected light passing through the lens 1 is guided to the AF sensor 16 via the sub-mirror 2a of the quick-return mirror 2. The control circuit 7 then determines an extent of lens delivery according to an output of the AF sensor 16. The position of the photo-taking lens 1 is shifted by the lens driving means 9 to an in-focus position thereof.

Meanwhile, the lens information detecting means 8 detects information on the focal length of the photo-taking lens 1 and information on the object distance which is obtained at the distance ring with the lens 1 in the in-focus position. The two types of information thus detected are supplied to the control circuit 7. The control circuit 7 decides, on the basis of the two types of information and the change-over curve stored in the program memory 18, whether the DV flash adjusting method is to be performed according to the information on the object distance or the external-metering flash adjusting method is to be performed according to an output of the external-metering flash adjustment sensor 15. After that, the light emitting part 14 of the flash device is allowed to flash. Then a photographing operation is carried out according to a flash adjusting method decided by the control circuit 7.

Assuming that the photographing operation is decided to be performed in the DV flash adjusting method, the embodiment operates as follows: The aperture value of the photo-taking lens 1 is determined by dividing the guide number of the light emitting part 14 of the flash device by the object distance information obtained. Then, the light emitting part 14 is allowed to flash when the shutter 3 is fully opened with the quick-return mirror 2 retracted from the photographing optical path. The image sensor 4 is thus exposed to light of the image of an object to be photographed. The object's image thus obtained is recorded on a recording medium such as a magnetic disc by the recording circuit 6 through the image signal processing circuit 5.

If the photographing operation is decided to be performed in the external-metering flash adjusting method, the light emitting part 14 is allowed to flash after the shutter 3 is fully opened with the quick-return mirror 2 extracted from the photographing optical path. Then, light reflected from the object resulting from the flashing action is received and integrated by the external-metering flash adjustment sensor 15. The flash light emitting action of the light emitting part 14 is brought to a stop when an integrated value of the received light reaches an apposite quantity of received light. After that, an object's image thus obtained is recorded on the magnetic disc or the like in the same manner as in the above-stated case.

The change-over curve which is provided and stored in the program memory 18 for change-over between a DV flash adjustment area and an external-metering flash adjustment area is arranged as described below. First, the degree of AF accuracy which is necessary in carrying out the DV flash adjusting method according to the object distance information obtained by an AF system can be determined as follows: Assuming that a distance to the object is $x_0$, the degree of defocus at an image plane is $x_0'$, a distance to the object which can be covered by the depth of focus is $x$, the degree of defocus at the image plane in the event of the distance $x$ is $x'$ and the focal length of the photo-taking lens is $f$, the required AF accuracy $lx'$ is obtained from the Newton's formula and expressed as follows:

$$lx' = x' - x_0' \qquad (1)$$
$$= f^2(-1/x + 1/x_0)$$

If it is desired to have the flash adjustment accuracy within ±1 EV, since the illuminance of the surface of the object is in proportion to 1/square of an object distance according to the law of inverse square, a required distance accuracy, with the object distance assumed to be 1 m, must be within a range of $$\sqrt{1/2^{+1}} \text{ to } \sqrt{1/2^{-1}} = 0.707 \text{ to } 1.414 \text{ times}$$

the object distance.

Here, an allowable limit on the far distance side is expressed as:
$$x = 1.414 \, x_0 \qquad (2).$$
With Formula (2) substituted for Formula (1), the required AF accuracy on the far distance side can be expressed as follows:

$$lx' = f^2(-1/1.414 \, x_0 + 1/x_0) \qquad (3)$$
$$= 0.293 \, f^2/x_0$$

This indicates that the distance accuracy required for the AF operation is more severe on the far distance side than on the near distance side.

Assuming that the AF accuracy is set at 40 μ ($lx' = 0.04$ mm) of the defocus degree, the object distance that satisfies the required flash adjustment accuracy of ±1 EV for each focal length of the photo-taking lens can be computed and obtained from Formula (3) as one of values shown in the following table:

TABLE

| Focal length (mm): | 6 | 11 | 22 | 33 |
|---|---|---|---|---|
| Object distance (m): | 0.3 | 0.9 | 3.7 | 8.4 |

In other words, the DV flash adjusting method can be accomplished to meet the required degree of flash adjustment accuracy if the object distance is within the allowable limit values shown in the above table with respect to the focal length values of the photo-taking lens.

Figure 2:
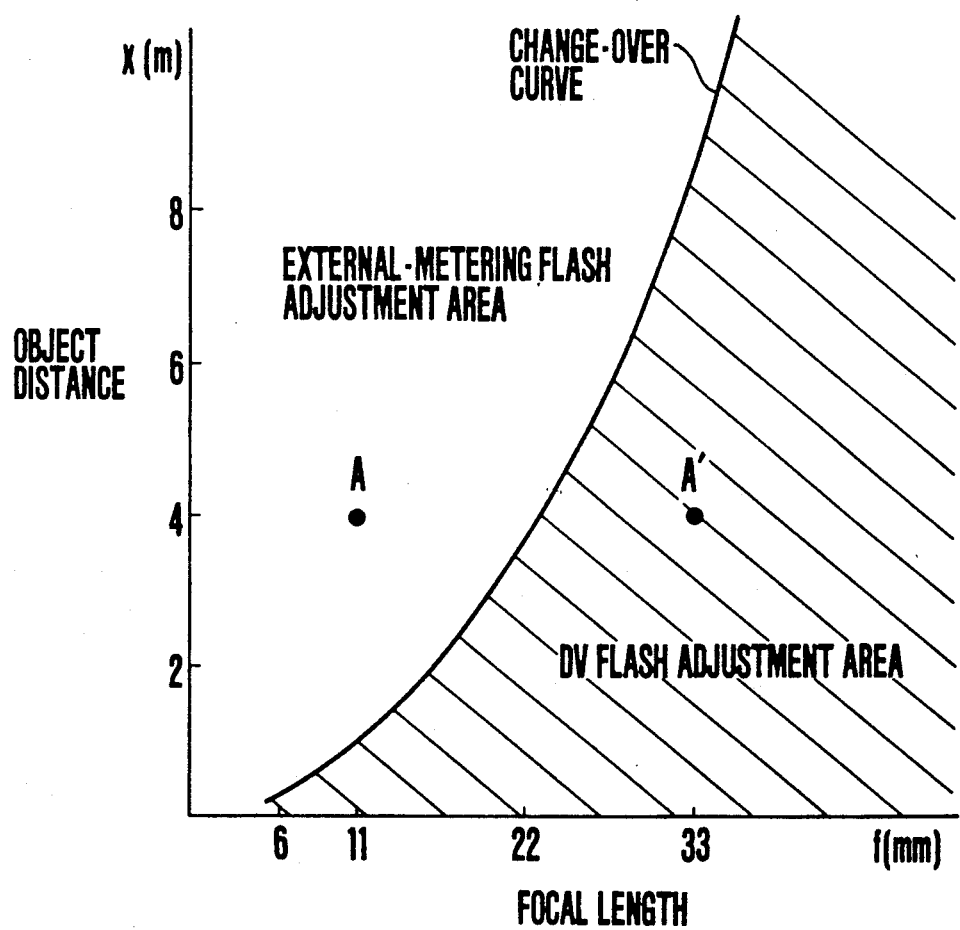
FIG. 2 is a graph showing a flash adjustment area change-over curve stored in a memory 18 shown block diagrams respectively in FIG. 1.

FIG. 2 shows the above-stated relationship. In FIG. 2, the axis of abscissa indicates the focal length of the photo-taking lens and the axis of ordinate the object distance. There are shown two areas including a hatched area which indicates the DV flash adjustment area and the other area which indicates the external-metering flash adjustment area. A boundary between the two areas represents the change-over curve for selection between the flash adjusting methods. The change-over curve is obtained from Formula (3) shown above. In the case of FIG. 2, the values shown in the table above are plotted. This graph represents a program which is stored in the program memory 18.

Further, as shown in FIG. 2, a usable area of the external-metering flash adjustment area increases accordingly as the focal length decreases. Generally, the accuracy of the external-metering flash adjustment increases accordingly as the object distance decreases. Normally, a photo-taking lens of the short focal length is used more frequently for photographing at a near object distance than at a far object distance. Therefore, this change-over arrangement for selection between the different flash adjusting methods permits an accurate flash adjustment on the whole.

Figure 3:
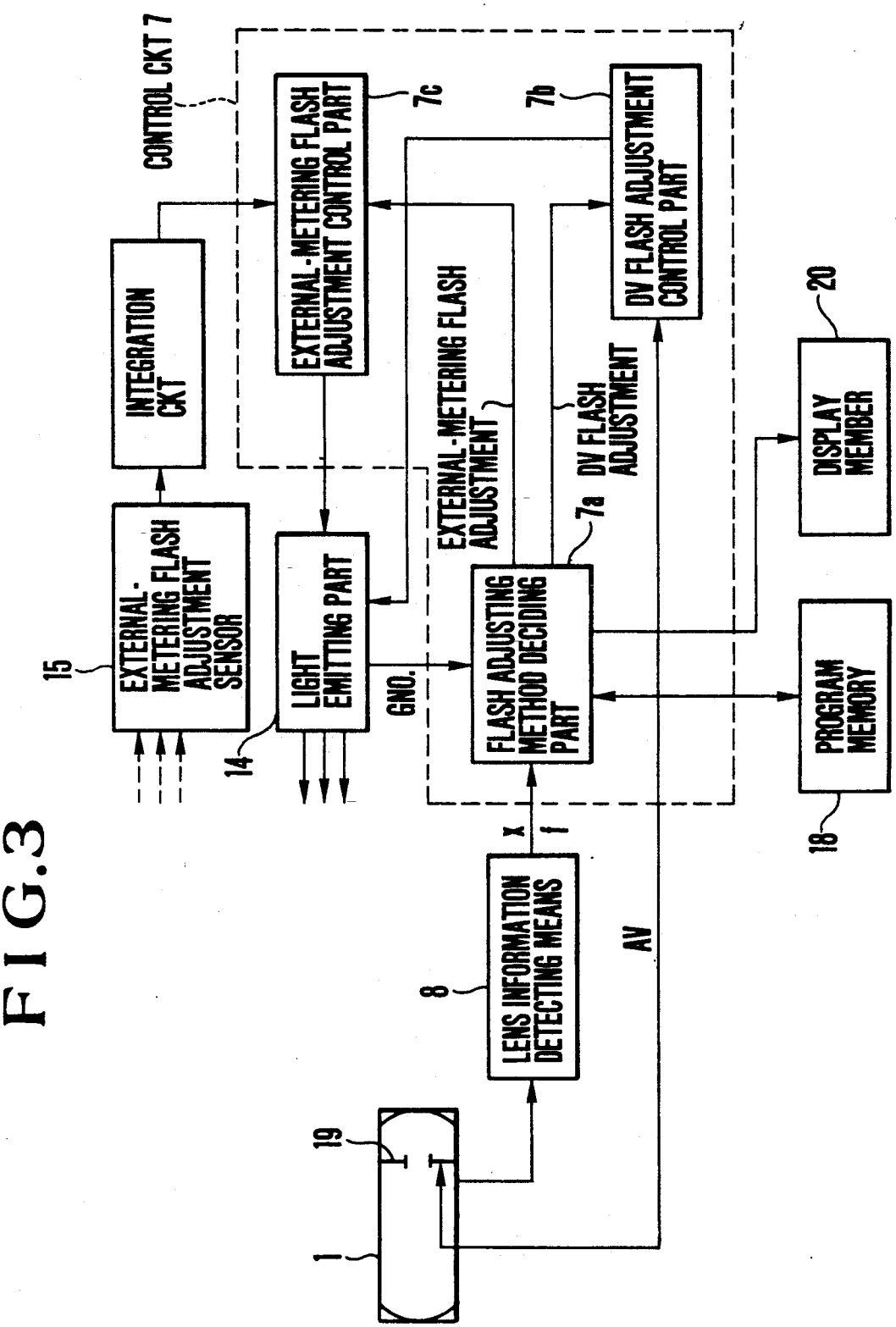
FIGS. 3 and 4 are block diagrams respectively showing by way of example the construction of a control circuit 7 shown in FIG. 1.

FIG. 3 is a block diagram showing by way of example the flash adjustment control arrangement of the control circuit 7. Referring to FIG. 3, a flash adjusting method deciding part 7a is arranged to decide whether the DV flash adjusting method is to be selected or the external-metering flash adjusting method is to be selected on the basis of information on a measured object distance and on the focal length received from the lens information detecting means 8 and information output from the program memory 18. The result of the decision is arranged to be displayed either within the viewfinder of the camera or by an external display member 20 which is, for example, an LCD. A DV flash adjustment control part 7b is arranged to determine an aperture value AV on the basis of the guide number (GNO.) of the flash device and the object distance information obtained by the lens information detecting means 8 when the DV flash adjusting method is selected by the flash adjusting method deciding part 7a. The DV flash adjustment control part 7b then drives and controls the diaphragm 19 and, at the same time, instructs the light emitting part 14 of the flash device to perform a flash light emitting action. An external-metering flash adjustment control part 7c is arranged to cause an external-metering flash adjusting action to be performed when the external-metering flash adjusting method is selected by the flash adjusting method deciding part 7a. Incidentally, the circuits 7a and 7b are composed of a microcomputer.

Figure 5:
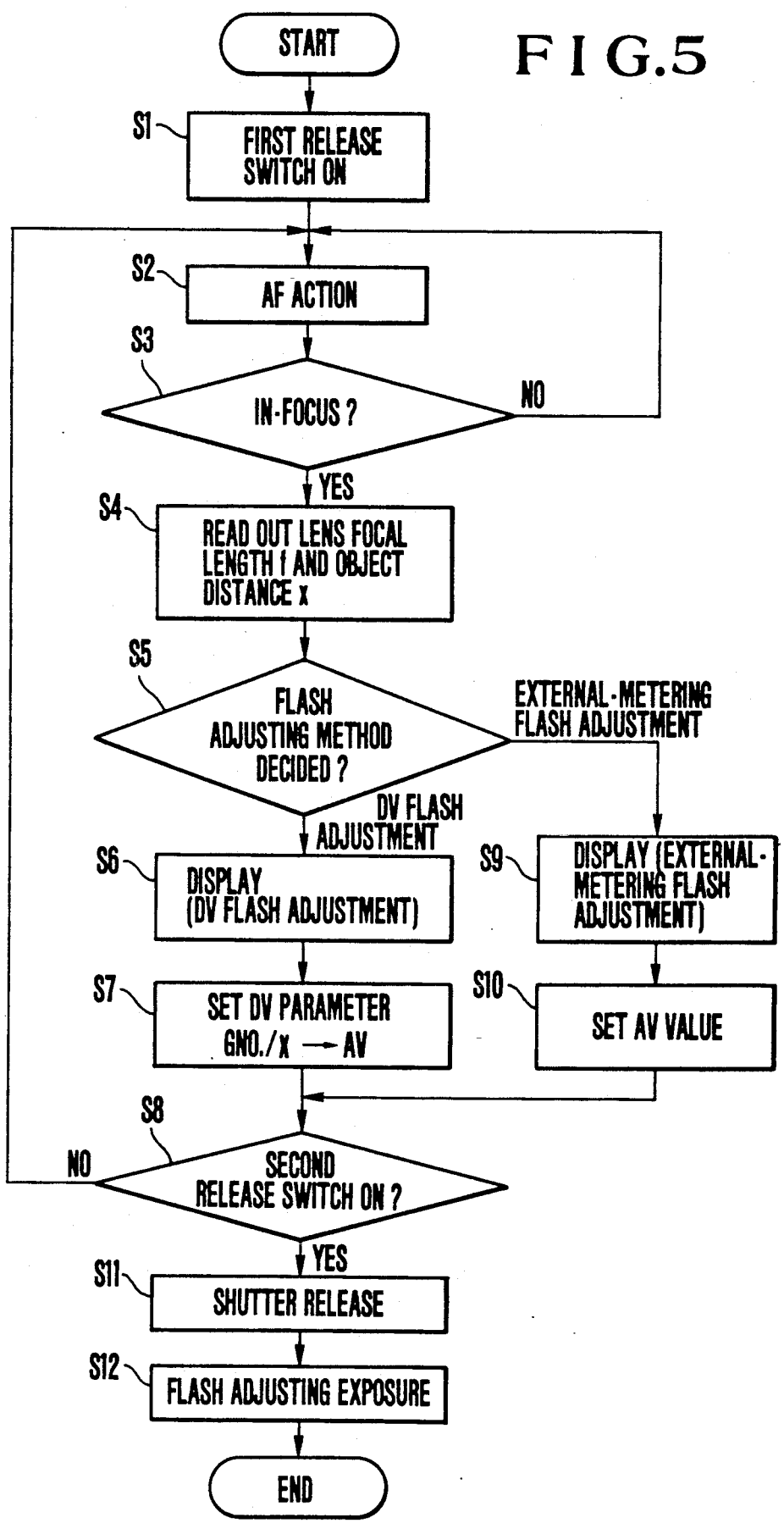
FIG. 5 is a flowchart showing the control program of the camera shown in FIG. 1.

Referring to FIG. 5 which is a flowchart, the control circuit 7 which is arranged as shown in FIG. 3 operates as follows: At a step S1: A first release switch which is not shown is turned on. At a step S2: With the first release switch turned on, the AF action begins. At a step S3: The AF action continues until an in-focus state is obtained. In the AF action, the degree of defocus is obtained by detecting the output of the AF sensor 16; and the lens is driven to shift its position to an extent corresponding to the degree of defocus. Upon completion of the AF action, the flow of operation proceeds to a step S4. At the step S4: The focal length f of the photo-taking lens and a distance x to the object are read out. Information on these values f and x is formed, for example, by means of a code plate which is arranged to produce a code signal indicating the focal length of the lens and another code plate which is arranged to produce an object distance signal in association with the operation of a distance ring. The above-stated lens information detecting means 8 is composed of these code plates. Upon completion of the step S4, the flow proceeds to a step S5.

At the step S5: In accordance with the change-over curve for selection between the flash adjusting methods stored in the program memory 18, a discrimination is made between selection of the DV flash adjusting method and that of the external-metering flash adjusting method on the basis of the focal length f and the object distance x read out at the step S4. This selection is made as shown in FIG. 2. If the DV flash adjusting method is selected, the flow proceeds to a step S6. At the step S6: A display is made by the display member 20 indicating that the DV flash adjusting method is selected, and then the flow proceeds to a next step S7. If it is the external-metering flash adjusting method that is selected at the step S5, the flow comes to a step S9. At the step S9: The display member 20 makes a display indicating that the external-metering flash adjusting method is selected, and the flow proceeds to a step S10.

At the step S7: To set a DV parameter, an aperture value (AV) is obtained by dividing the guide number (GNO.) of the flash device by the object distance information x which has been obtained in the above-stated manner. The guide number is supplied from the light emitting part 14 of the flash device. After the step S7, the flow proceeds to a step S8. At the step S8: A second release switch which is not shown is turned on with the DV flash adjusting method selected. At a step S11: With the second release switch turned on, a shutter release is effected. At a step S12: An exposure operation is carried out in the DV flash adjusting method. More specifically, the shutter release at the step S11 is executed by controlling the diaphragm 19 in a known manner on the basis of the aperture value AV which is obtained at the step S7; and by opening the shutter 3 with the mirror 2 uplifted. Then, at the step S12, the DV flash adjusting method is carried out by triggering and causing the light emitting part 14 to emit a quantity of light corresponding to the guide number with the shutter 3 fully opened.

Further, in the event of selection of the external-metering flash adjusting method, an aperture value AV is set at a value suited for flash photography at a step S10. With the second release switch found to be in an on-state at the step S8, the diaphragm 19 is set at an aperture value for flash photography in response to the shutter release action performed at the step S11. Then, the mirror 2 is uplifted and the shutter 3 is opened to perform photographing in the external-metering flash adjusting method performed in the known manner by triggering and causing the light emitting part 14 to emit a flash light and by bringing the flashing action to a stop when the output of the sensor 15 which is obtained by integrating a reflected light resulting from the flashing action reaches a given value.

In the DV flash adjusting method, the accuracy of flash adjustment is dependent upon the distance measuring accuracy of the range finder of the camera. If the accuracy of the range finder is dependent on the state of the object to be photographed, therefore, the accuracy of flash adjustment might be greatlY affected by a specific state of the object. To solve this problem, the reliability of flash adjustment can be enhanced by the auxiliary use of the external-metering flash adjusting method when carrying out photographing in the DV flash adjusting method.

Figure 4:
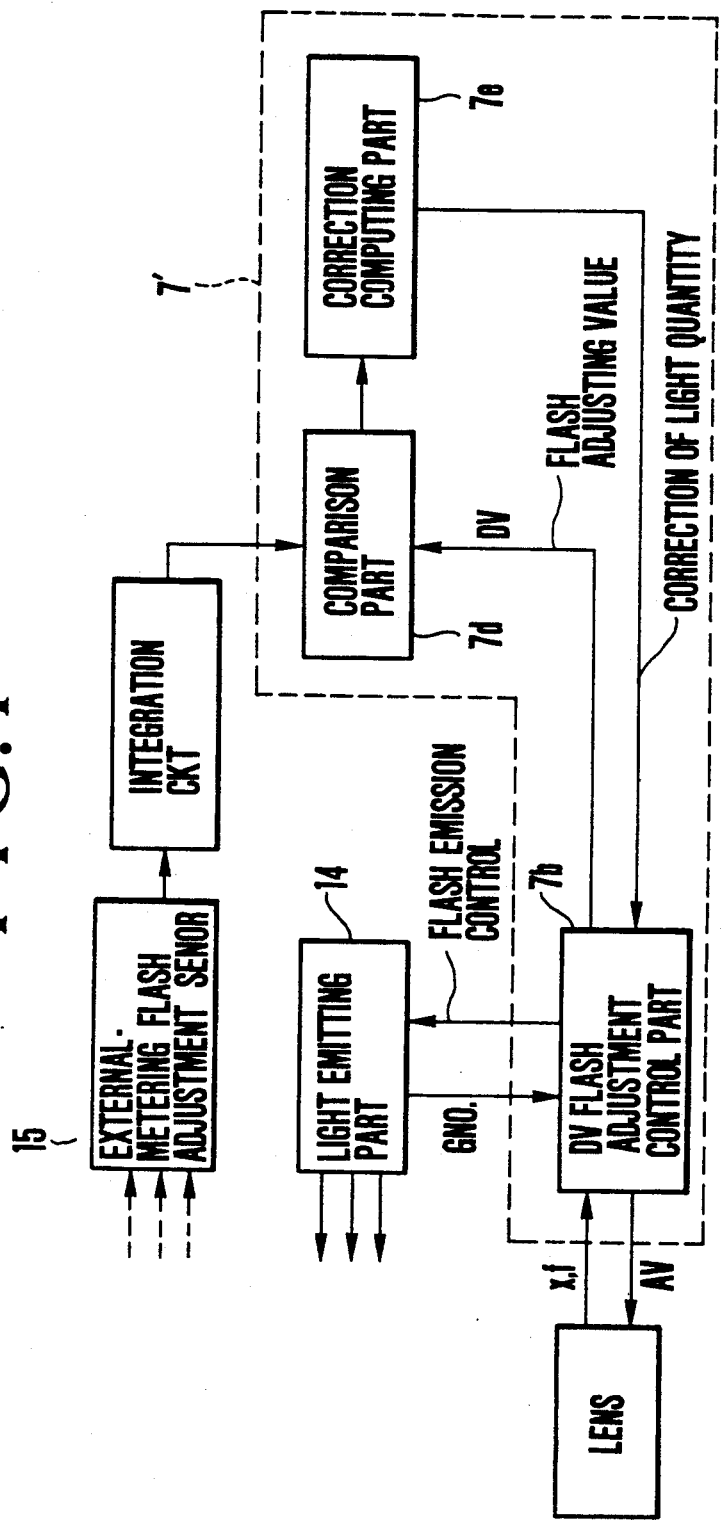
Figure 6:
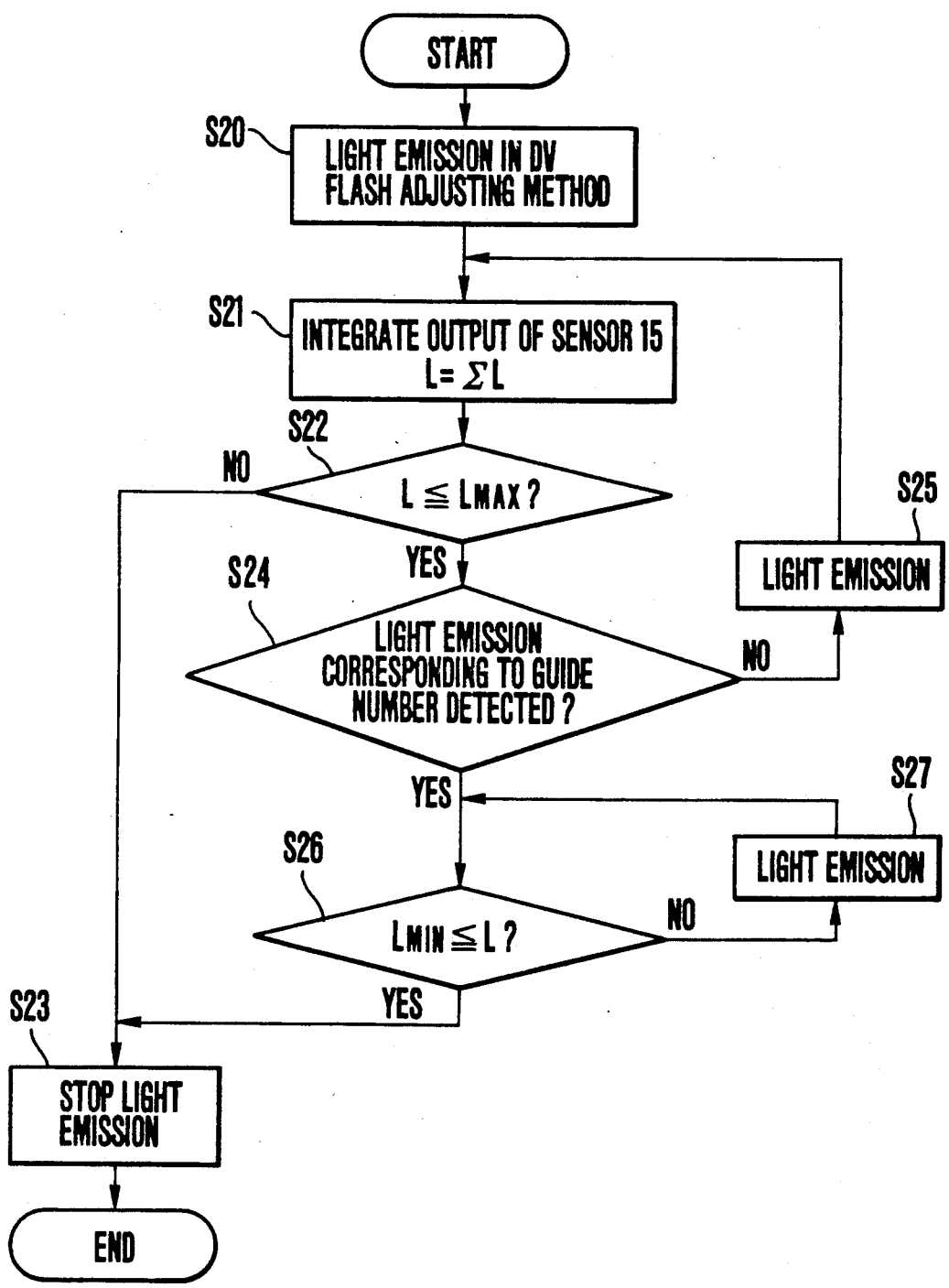
FIGS. 6 and 7 are flowchart showing other programs for flash adjustment.

FIG. 4 is a block diagram showing a control circuit 7' which is another example of the control circuit 7 according to the invention and employing the above-stated flash adjusting method. FIG. 6 is a flow chart showing the flow of the processing operation of the circuit shown in FIG. 4.

The control circuit 7' comprises a DV flash adjustment control part 7b, a comparison part 7d and a correction computing part 7e. The comparison part 7d is arranged to compare an integrated value of reflected light which is received from the object by the external-metering flash adjustment sensor 15 with predetermined allowable upper and lower limit values $L_{MAX}$ and $L_{MIN}$ of received light quantity. The correction computing part 7e is arranged to instruct the DV flash adjustment control part 7b to bring flash light emission to an end when the integrated value of received light reaches the allowable upper limit value $L_{MAX}$ before the light emission comes to an end in the DV flash adjusting method. In a case where the integrated value of reflected light is found to be smaller than the allowable lower limit value $L_{MIN}$ at the end of the flash light emission in the DV flash adjusting method, the correction computing part 7e instructs the DV flash adjustment control part 7b to have the light emission continue and instructs the control part 7b to bring the light emission to a stop when the integrated value of received light comes to exceed the allowable lower limit value $L_{MIN}$.

Referring to FIG. 6, the control circuit 7' operates as follows: At a step S20: Light is emitted in the DV flash adjusting method. At a step S21: An integrated value of received light is detected, and the flow proceeds to a step S22. At the step S22: If the integrated value L of received light comes to exceed the allowable upper limit value $L_{MAX}$ before the light emission in the DV flash adjusting method comes to a stop, i.e. before a quantity of light corresponding to the guide number is emitted, the flow comes to a step S23 to bring the light emission to a stop by applying a stop signal to the light emitting part 14 of the flash device. If the integrated value L is found not to exceed the upper limit value $L_{MAX}$ at the step S22, the flow comes to a step S24. At the step S24: A check is made to find whether the quantity of light corresponding to the guide number have been emitted. If not, the flow comes to a step S25 to allow the light emission to continue until the quantity of light corresponding to the guide number is emitted. When the quantity of emitted light corresponding to the guide number is detected at the step S24, the flow comes to a step S26. At the step S26: The above-stated integrated value L is compared with the allowable lower limit value $L_{MIN}$. If the former L is found to be less than the latter $L_{MIN}$, the flow comes to a step S27 to allow the light emission to continue. When the former L becomes larger than the latter $L_{MIN}$, a stop signal is applied to the light emitting part 14 to bring light emission to a stop and the light adjustment comes to an end.

The process described enables the DV flash adjusting method to be accomplished within a given error range as any flash adjustment error that results from a distance measurement error, etc. can be limited by the auxiliary use of the external-metering flash adjusting method.

Figure 7:
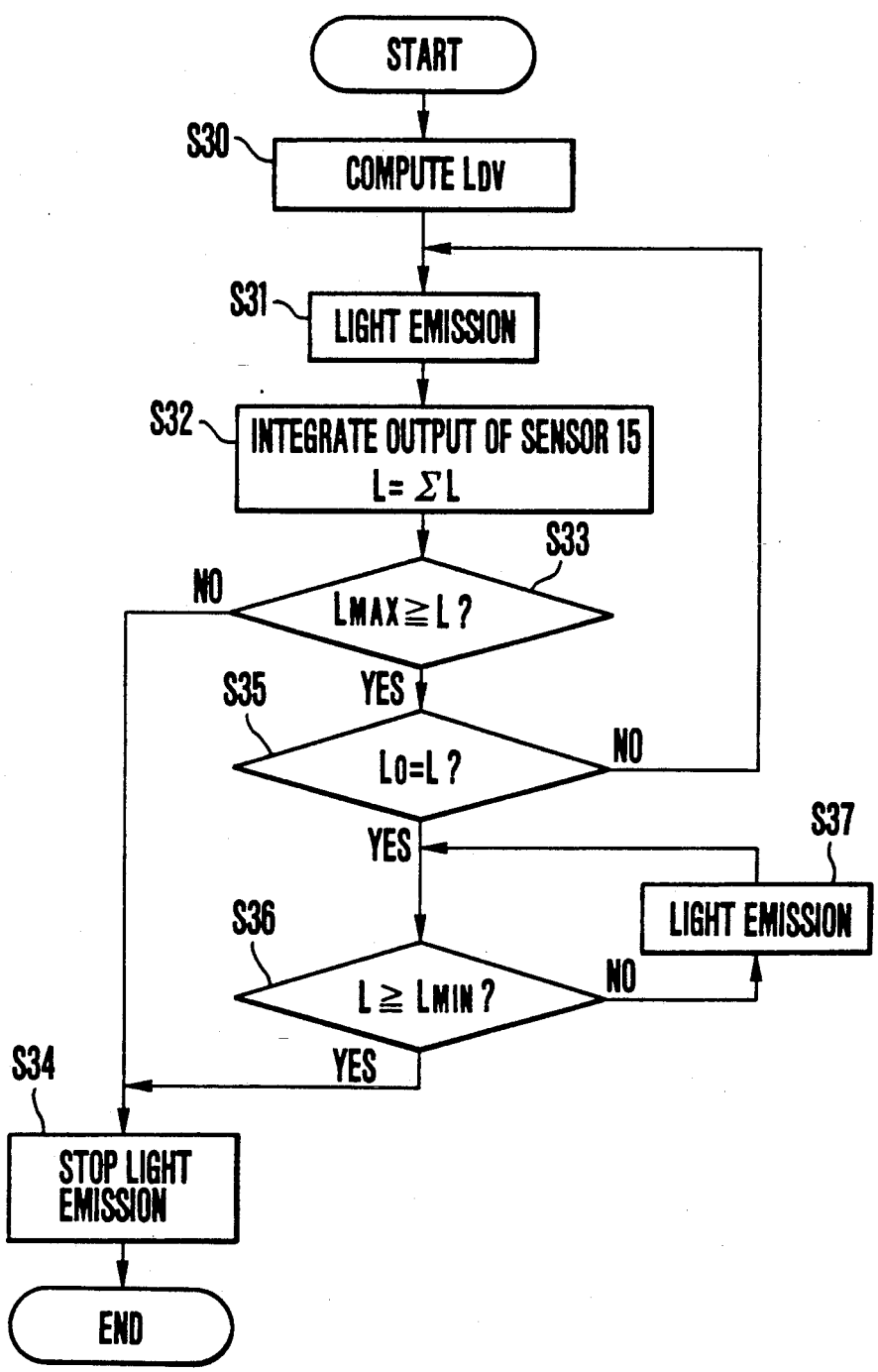

Further, in accordance with the external-metering flash adjusting method, some flash adjustment error that exceeds 2 EV might result from differences in the reflection factor among backgrounds and objects to be photographed. The excessive error can be prevented by enhancing the reliability of the flash adjustment by using a DV flash adjusting value (the guide number) as auxiliary flash adjusting means in a manner reverse to the arrangement of the embodiment described in the foregoing. In this case, the control circuit can be arranged basically in the same manner as the circuit shown in FIG. 4. FIG. 7 shows the process of operation of that arrangement.

Referring to FIG. 7, at a step S30, the DV flash adjusting value $L_{DV}$ to be obtained in the DV flash adjusting method is computed according to a formula x × $AV \pm L_{DV}$ using the object distance x obtained from the photo-taking lens and an aperture value AV set by the external-metering flash adjusting method. At a step S31: The flash light is emitted in response to a shutter release signal. At a step S32: The light reflected from the object is received and integrated by the external-metering flash adjustment sensor 15. At a step S33: A check is made for the integrated value L of received light. If the integrated value L is found to exceed the allowable upper limit value $L_{MAX}$ for the DV flash adjusting value LDV, the flow comes to a step S34 to bring the light emission to a stop. If the former is found not exceeding the latter, the flow comes to a step S35 to compare the integrated value L with an apposite light quantity Lo for the external-metering flash adjusting method. If the integrated value L comes to coincide with the apposite light quantity Lo, the flow proceeds to a step S36. At the step S36: The integrated value L is compared with the allowable lower limit value $L_{MIN}$ for the DV flash adjusting value $L_{DV}$. If the integrated value L is found to be less than the lower limit value $L_{MIN}$, the flow comes to a step S37 to allow the light emission to continue. When the integrated value L comes to exceed the allowable lower limit value $L_{MIN}$, the light emission is brought to a stop and the flash adjusting process comes to an end.

With the process performed in the above-stated manner, any excessive flash adjustment error that is made by the external-metering flash adjusting method due to some condition of the object, etc. can be limited to a given range of allowable errors by virtue of the limiting control performed by the DV flash adjusting method which is used in combination with the external-metering flash light adjusting method.

Figure 8:
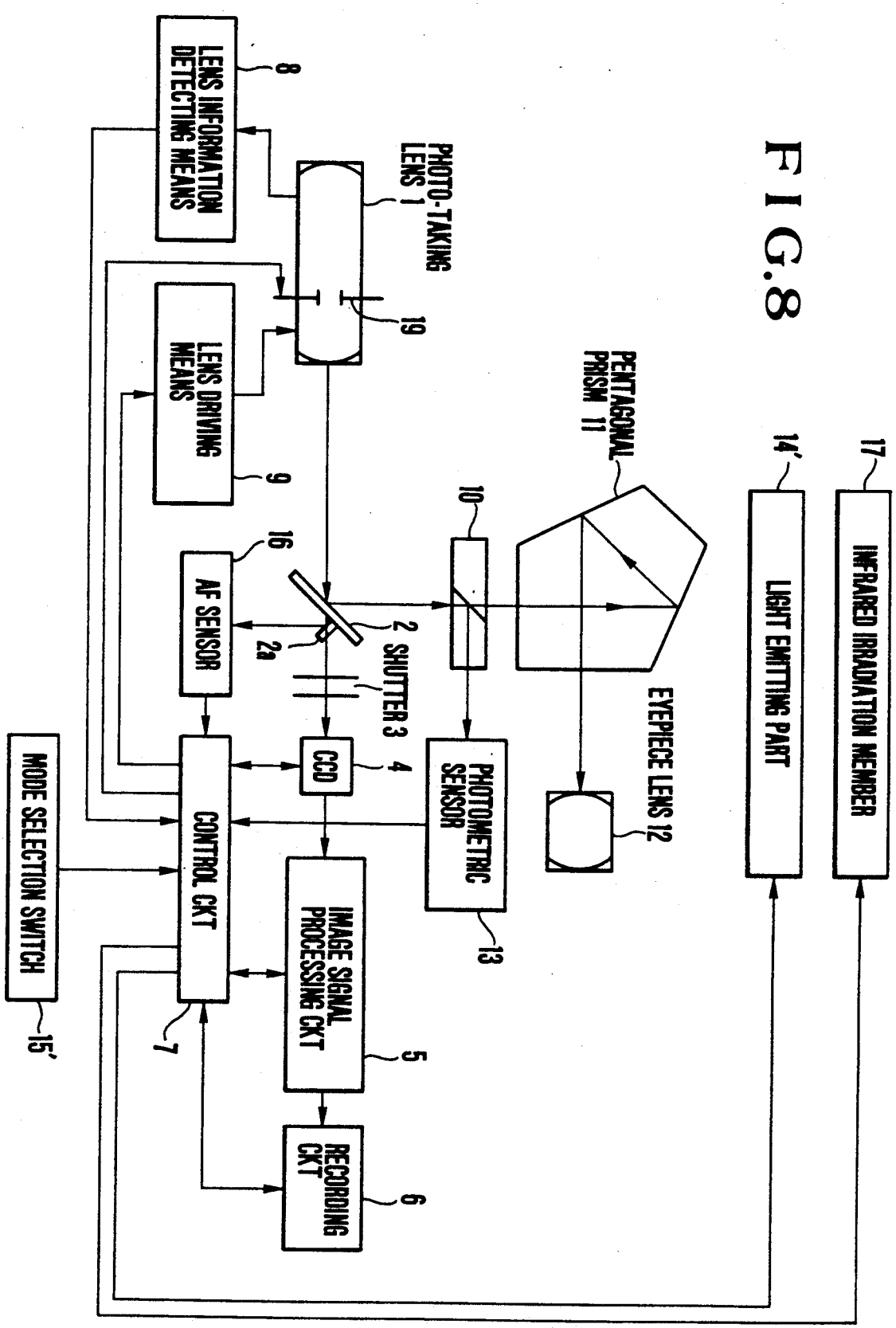
FIG. 8 is a block diagram showing another. embodime,nt of the invention.

FIG. 8 is a block diagram showing a camera system which is arranged according to this invention as another embodiment thereof. In FIG. 8, the same component parts as those of the embodiment shown in FIG. 1 are indicated by the same reference numerals. The camera system is provided with a mode selection switch 15'. This switch 15' is used for selection between an aperture-priority distance measuring mode in which the diaphragm 19 is controlled to have an arbitrarily set aperture value and an automatic aperture-setting distance measuring mode in which an aperture value is determined on the basis of the object distance and the guide number of the flash device. Further, in this case, the system has a light emitting part 14' which is arranged to have a variable guide number. These are points in which the embodiment shown in FIG. 8 differs from the embodiment shown in FIG. 1.

With a flash device control system arranged as described above, the system performs a flash adjusting action in the following manner:

In the event of flash photography, the object to be photographed is irradiated with an infrared ray by the infrared irradiation member 17. An infrared light reflected from the object then comes through the photo-taking lens 1 to be guided to the AF sensor 16 via the sub-mirror 2a of the quick-return mirror 2. Then, a lens delivering extent is determined by the control circuit 7. The lens driving means 9 is caused to shift the position of the lens 1 to an in-focus position thereof. Object distance information which is obtained at the distance ring of the photo-taking lens 1 when the lens 1 is in an in-focus state is detected by the lens information detecting means 8.

If the mode selection switch 15' is in a position selecting the automatic aperture-setting distance measuring mode under this condition, an aperture value is determined by dividing the guide number of the flash device by the object distance information obtained in the above-stated manner. With the aperture value determined in this manner, the shutter speed is automatically determined. The light emitting part 14' is allowed to flash under the above-stated conditions when the shutter 3 is fully opened with the quick-return mirror 2 retracted from the photographing optical path. The image sensor 4 is exposed to light of an image of the object. After the exposure, the object's image is recorded on a recording medium such as a magnetic disc by the recording circuit 6 through the image signal processing circuit 5.

In a case where the aperture-priority distance measuring mode is selected by the mode selection switch 15', the guide number of the flash device is determined by performing a multiplying operation on an arbitrarily set aperture value and the measured object distance. A shutter speed is then automatically determined from the arbitrarily set aperture value. A shutter release action is performed at this shutter speed. Meanwhile, flash photography is carried out in the DV flash adjusting method performed at the guide number determined.

Figure 9:
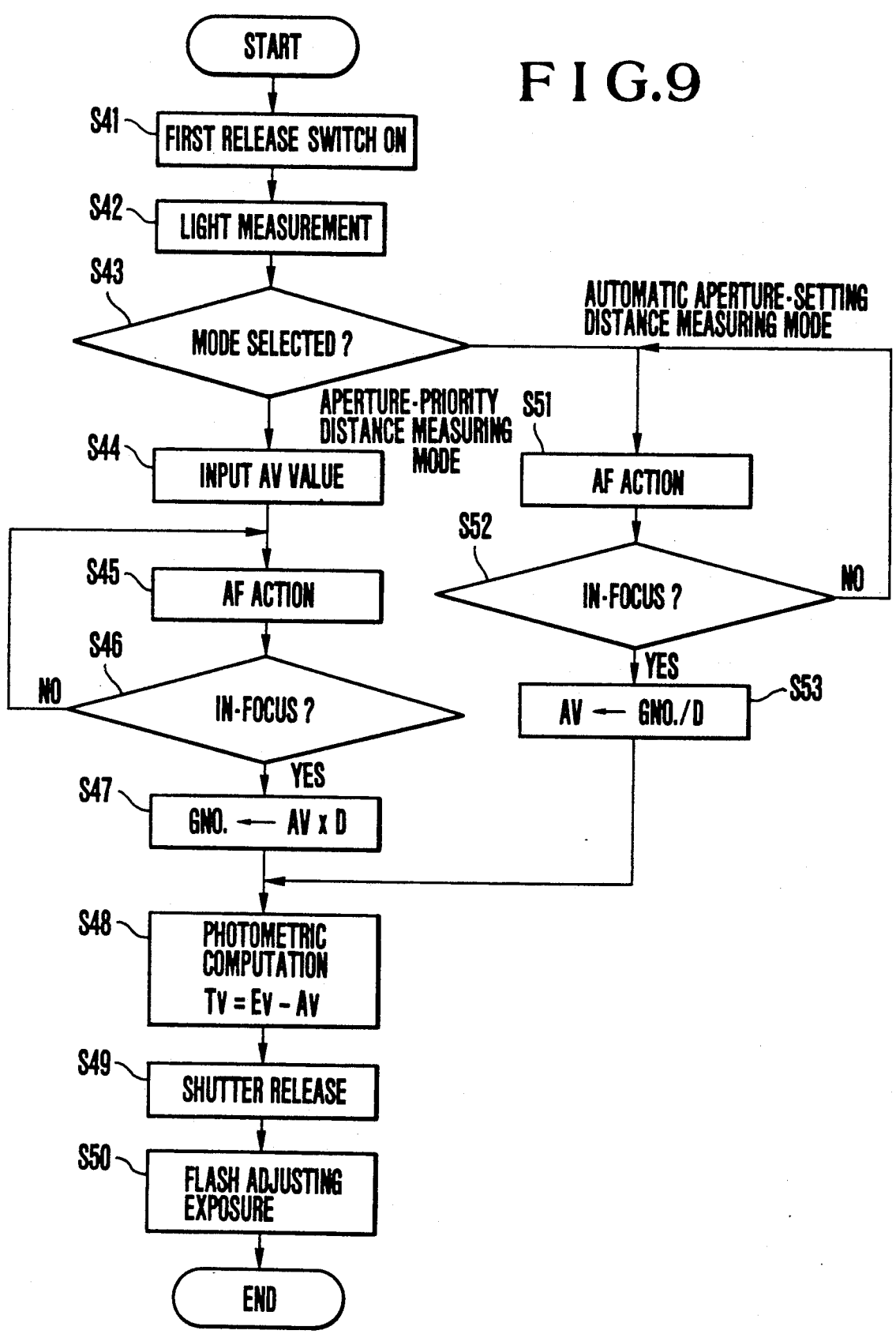
FIG. 9 is a flowchart showing the program of the embodiment shown in FIG. 8.

Referring now to FIG. 9 which is a flowchart, the operation of the control circuit 7 is described as follows: At a step S41: The first release switch which is not shown is turned on. At a step S42: A light measuring action is performed. At a step S43: Then, the mode selection switch 15' is checked to find whether the aperture-priority distance measuring mode or the automatic aperture-setting distance measuring mode is selected. If the aperture-priority distance measuring mode is selected, the flow of operation proceeds to a step S44. At the step S44: An aperture value AV desired by the photographer and set by means of an aperture setting operation member (not shown) is input. Then, an AF action begins at a step S45. The AF action is performed in the same manner as in the case of the embodiment shown in FIG. 1. At a step S46: A check is made for an in-focus state. When the in-focus state is obtained, the flow proceeds to a step S47. At the step S47: The input aperture value AV is multiplied by a measured distance value D which is detected by the lens information detecting means 8, so that the guide number (GNO.) of the flash device is determined. The flow then proceeds to a step S48 to carry out a photometric computation: $TV = EV - AV$. At a next step S49: When the second release switch which is not shown is turned on, a shutter release is effected at a shutter speed which is determined according to the input aperture value mentioned above. At a step S50: A flash photographing operation is carried out in the DV flash adjusting method on the basis of the light measurement parameters, i.e. the guide number determined in the above-stated manner and the set aperture value.

In other words, the above-stated actions are executed when the first release switch is turned on. The photometric sensor 13 performs a light measuring action (step S42). Therefore, when an aperture value is determined, the shutter speed is determined through a known photometric computing operation according to the exposure value (photometric value) of the background (step S48). Meanwhile, at the step S47, a guide number which likely gives a flash light emission amount apposite to a main object is determined on the basis of the aperture value which is set in the manner as mentioned in the foregoing. Therefore, the photographing operation can be carried out with an exposure apposite to both the main object and the background thereof. This gives a clear and sharp picture of a person or the like under a backlighting condition like in the event of daylight synchroflash photography.

The details of the shutter release action of the step S49 are as follows: This action is carried out by a known method in the same manner as in the case of the embodiment shown in FIG. 1. The diaphragm 19 is controlled and shifted to the position of the above-stated aperture value. The mirror 2 is uplifted and then the shutter 3 is opened. The shutter speed is controlled in accordance with the shutter time value determined in the manner described. Further, the flash adjusting operation of the step S50 is executed as follows: The information on the guide number determined at the step S47 is transmitted to the light emitting part 14'. Then, the guide number of the light emitting part 14' is set at the value determined at the step S47. With the shutter 3 opened, a trigger signal is applied to the light emitting part 14' to cause it to emit a flash light. The flash light is then emitted in an amount corresponding to the above-stated guide number.

Further, with the aperture value set on the full aperture side of the diaphragm 19, if the shutter speed determined exceeds the range of X-sync speeds, the flash light is normally not emitted. The embodiment is, therefore, capable of carrying out a photographing operation as desired by the photographer by increasing the aperture value.

In a case where the automatic aperture-setting distance measuring mode is found to have been selected at the step S43, the flow of operation is executed as follows: With the first release switch which is not shown turned on, the AF action is performed at a step S51 in the same manner as in the step S45. At a next step S52: When an in-focus state is found, the flow proceeds to a step S53. At the step S53: The currently set guide number (GNO.) is divided by a measured distance value D obtained then. By this, an aperture value AV is determined. When the second release switch is turned on, the shutter release action is performed at the step S49 in the same manner as described in the foregoing. Further, in the case of this mode, the shutter release action is performed with the diaphragm 19 set at the aperture value determined at the step S53. The shutter speed is also set at a shutter time value determined on the basis of a photometric value and the aperture value determined at the step S53. Further, in the flash adjusting operation of the step S50, the guide number is at the above-stated initial setting value. The amount of flash light emission is controlled according to this guide number.

Figure 10:
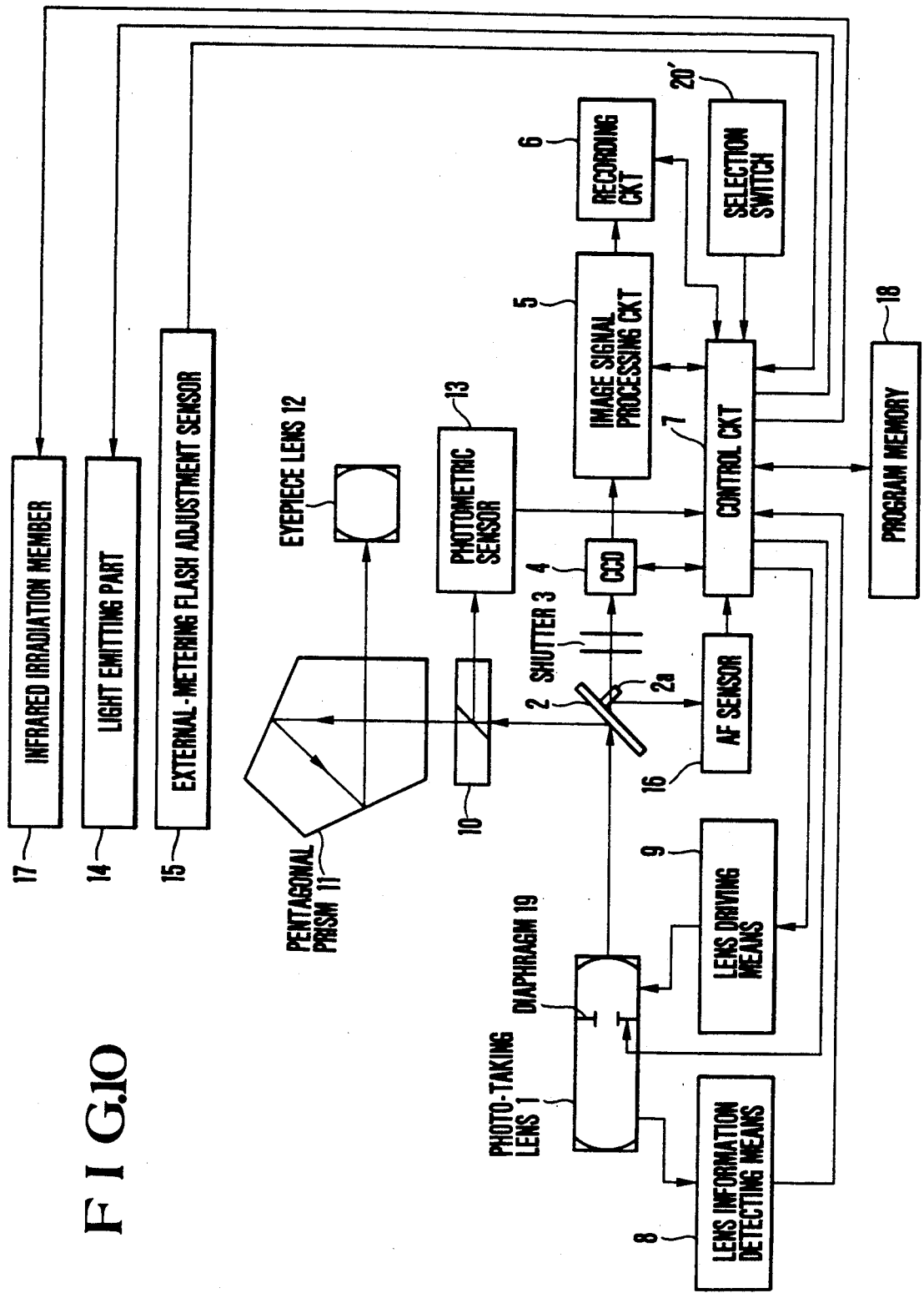
FIG. 10 is a block diagram showing a further embodiment of the invention.
Figure 11:
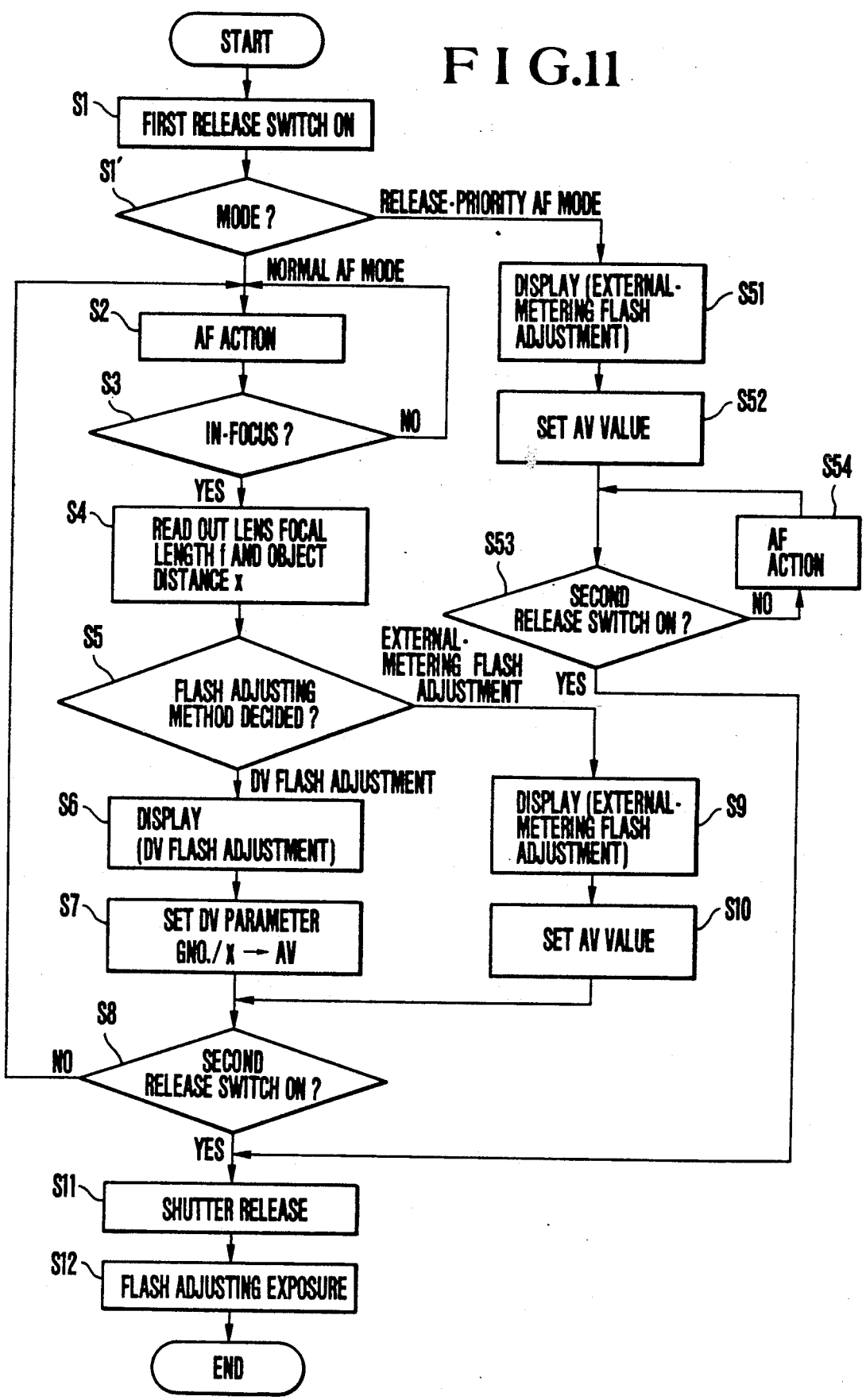
FIG. 11 is a flowchart showing the program of the embodiment shown in FIG. 10.

FIG. 10 shows the arrangement of a further embodiment of the invention. In FIG. 10, the same component parts as those of FIG. 1 are indicated by the same reference numerals. In the case of this embodiment, the camera is provided with a selection switch 20' for selection between two different automatic focusing modes including a normal AF mode and a release-priority AF mode. In the normal AF mode, a shutter release action is inhibited until an in-focus state is obtained. In the release priority AF mode, the shutter release action is performed immediately after a release operation. The embodiment differs from the embodiment shown in FIG. 1 in this point FIG. 11 is a program flowchart showing the operation of the embodiment shown in FIG. 10. The flow of program is about the same as the program flow chart of FIG. 5 which shows the operation of the embodiment shown in FIG. 1. In FIG. 11, the same step numbers as those of FIG. 5 are assigned to the same parts of the flow.

Referring to FIG. 11, the operation of the embodiment shown in FIG. 10 is described as follows: In a case where the switch 20' is in a position selecting the normal AF mode, the program is executed as follows: At a step S1: The first release switch is turned on. Then, the flow proceeds to a step S1'. At the Step S1'; A check is made for the mode selected. Since it is the normal AF mode that is selected in this instance, the flow proceeds to a step S2. At the step S2 and subsequent steps: The operation of the camera system is controlled in exactly the same manner as in the case of the flow shown in FIG. 5. The operation is controlled either by the DV flash adjusting method or by the external-metering flash adjusting method according to the focal length and the object distance.

In the event of selection by the switch 20' of the release-priority AF mode, the flow of program is as follows: The flow comes to steps S51 and S52 to have a display made to indicate the external-metering flash adjustment and to set an aperture value suited for flash photography in the same manner as at steps S9 and S10. At steps 53 and S54: If the second release switch is found not to have been turned on, the AF action is repeated. When the second release switch is turned on, the flow immediately proceeds to a step S11. In this instance, therefore, a flash adjusting operation is carried out in the external-metering flash adjusting method.

Figure 12:
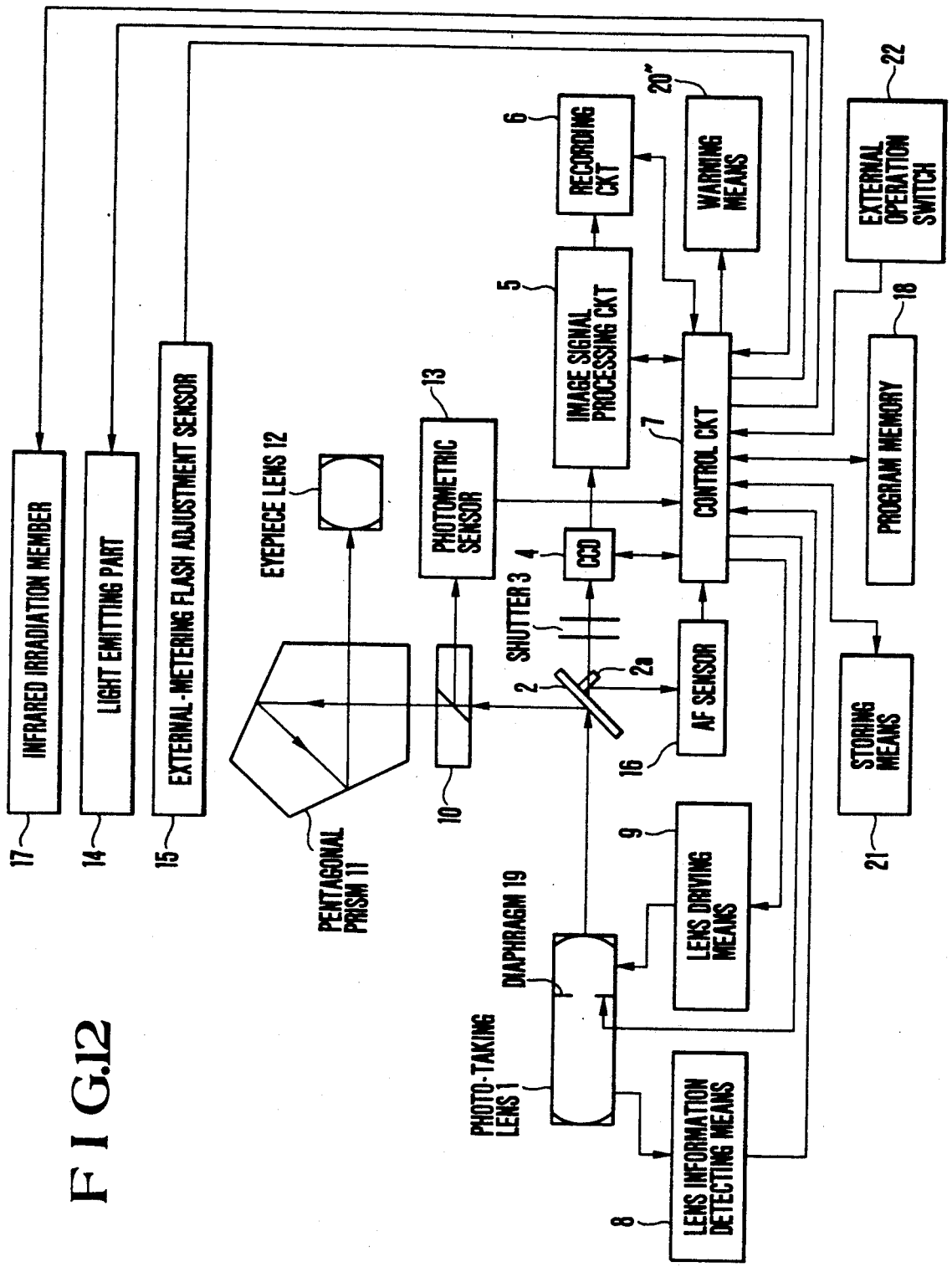
FIG. 12 is a block diagram showing a further embodiment of the invention.

FIG. 12 shows the arrangement of a further embodiment of the invention. In FIG. 12, the same component parts as those of the embodiment shown in FIG. 1 are indicated by the same reference numerals. The embodiment is provided with an external operation switch 22 and a storing means 21 which includes a buffer, etc. The storing means 21 is arranged to store DV flash adjustment parameters (an aperture value and a guide number) when the switch 22 is turned on.

In cases where the object to be photographed is located outside of the DV flash adjustment area (see FIG. 2), in the embodiment of FIG. 12, the focal length of the photo-taking lens 1 is shifted to a longer focal length position to obtain a state in which an object distance measuring (range finding) action can be carried out at a higher degree of accuracy. Then, the DV flash adjustment can be carried out at a shorter focal length on the basis of an object distance value which is obtained with the higher degree of accuracy at the longer focal length.

The reason for this arrangement of the embodiment is as follows: Referring to the DV flash adjustment area of FIG. 2, in the case of a distance measuring system of the passive type, the distance measurement error for the object distance increases accordingly as the focal length decreases. Therefore, the range of flash adjustment accuracy required for the image sensor 4 becomes narrower accordingly as the required degree of accuracy increases. This indicates that, if the distance measuring accuracy is high, photographing can be accomplished in the DV flash adjusting method even in cases where the object distance happens to be outside of the DV flash adjustment area at a focal length selected.

For example, assuming that the focal length f is 11 mm and the measured distance value x obtained from the AF sensor 16 is 4 m, this condition is not within the DV flash adjustment area, as represented by a point A in FIG. 2. This appears to be not allowing the DV flash adjustment. Meanwhile, however, there is a point A' within the DV flash measurement area although it is at the same object distance. Therefore, if the distance measuring action is temporarily performed at another focal length of, say, 33 mm in accordance with the above-stated method of this embodiment, a measured distance value can be obtained within the range of errors allowable for the DV flash adjustment. Then, a DV flash measurement parameter (aperture value) is determined according to this measured distance value and a guide number. After that, the focal length is readjusted back to the initial value of 11 mm. These processes enable a camera system to carry out flash photographing by the DV flash adjusting method even in cases where the use of the DV flash adjusting method is at first found impossible. In short, the DV flash adjustment area imposes no limitation if the measured object distance is accurate.

Figure 13:
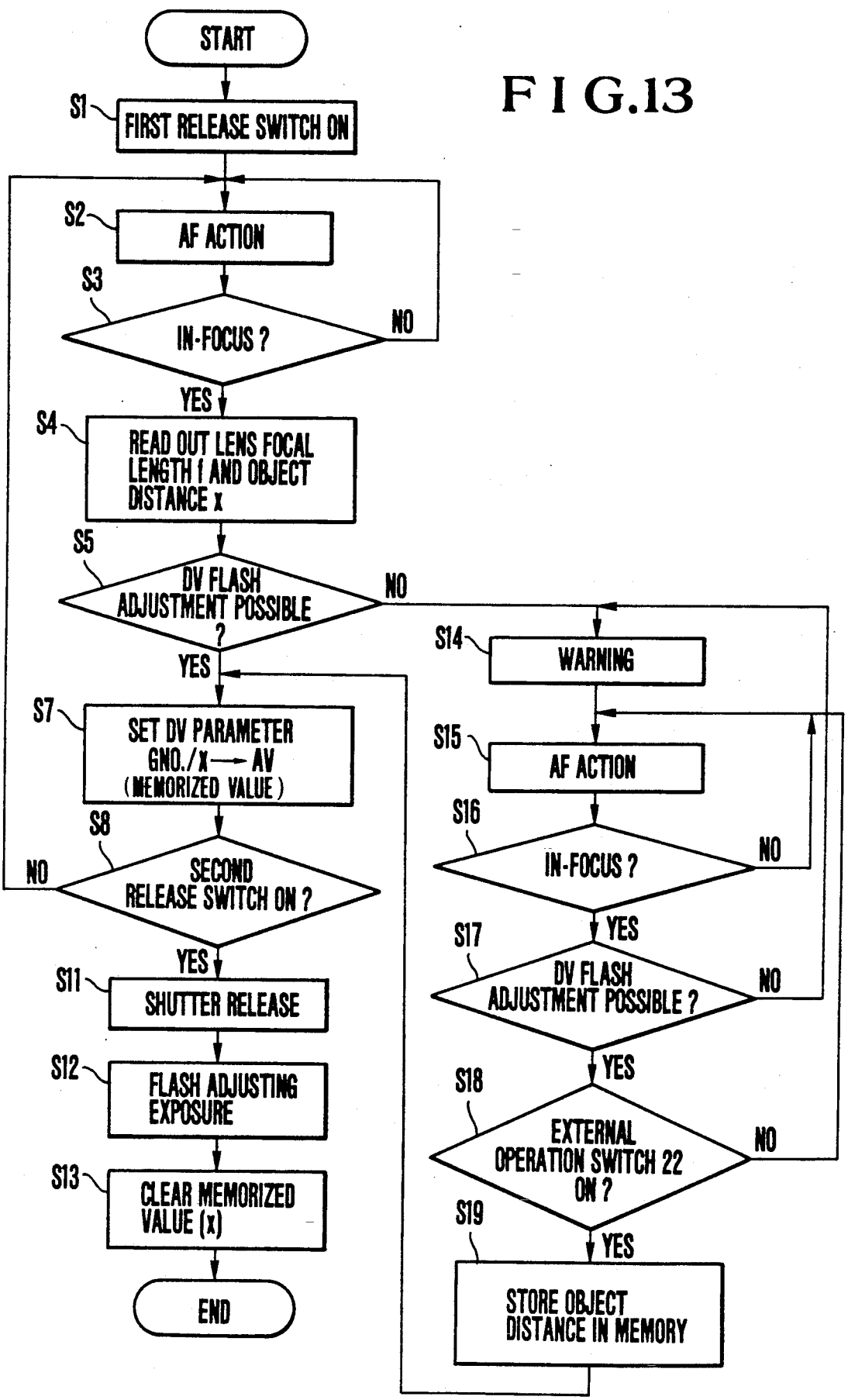
FIG. 13 is a flowchart showing the program of the embodiment shown in FIG. 12.

This embodiment is based on the above-stated concept. In the embodiment, the control circuit 7 is thus arranged to enhance the accuracy of a measured distance value by changing the focal length from one value to another to enable the flash adjustment to be accurately carried out. The operation of the control circuit 7 is as described below with reference to FIG. 13 which is a flowchart:

In the flow of program shown in FIG. 13, steps S1 to S5, S7, S8, S11 and S12 are executed in exactly the same manner as in the case of FIG. 5 and, therefore, they require no description. In a case where the focal length f and the object distance x are within the above-stated DV flash adjustment area of FIG. 2, an aperture value AV is obtained by computation, $GNO./x = AV$. The diaphragm 19 is set at the aperture value AV. Then, the DV flash adjusting method is performed to control the flash light to a quantity corresponding to the guide number.

If the focal length and the object distance are found to be outside of the DV flash adjustment area, the flow comes to a step S14. At the step S14: A warning means 20" is driven to warn the photographer of the impossibility of the DV flash adjustment according to information on the object distance currently obtained. This warning enables the photographer to manually change the focal length of the photo-taking lens 1 from the current focal length to a longer focal length without changing a distance between the camera and the object. At a step S15: An AF action is performed after the change of the focal length. At a step S16: A check is made to see if an in-focus state is obtained. If so, the flow comes to a step S17. At the step S17: A check is made to find whether the new focal length $f_{NEW}$ and a new object distance xNEW obtained at that time are within the DV flash adjustment area. If so, the flow proceeds to a step S18. At the step S18: The warning means 20" is stopped from operating to inform the photographer that the DV flash adjustment has become possible. Meanwhile, the external operation switch 22 is checked to see if the switch 22 is turned on. If so, the flow proceeds to a step S19. At the step S19: The new object distance $x_{NEW}$ is stored in the storing means 21. The flow then comes to the step S7.

After that, the steps S7 to S12 are executed as follows: An aperture value AV is obtained on the basis of the new object distance $x_{NEW}$ which is stored in the storing means 21 through computation, GNO./$x_{NEW}$ =AV. The diaphragm 19 is controlled and set at this aperture value AV. Then, the light emitting part 14 is controlled to have the flash light emitted in a quantity corresponding to the guide number. Further, at a step S13, the storing means 21 is reset to clear the value stored in the storing means 21.

Further, in the case of a camera of the kind having a so-called AF lock function whereby the focusing action on the photo-taking lens is brought to a stop when the lens comes to an in-focus position, if the AF lock function is allowed to operate at the new object distance, a motor which is arranged to drive a focusing lens must be continuously supplied with a current in such a way as to keep the distance ring of the lens stationary. Whereas, in accordance with the arrangement of the embodiment, the simple arrangement of storing the new object distance $x_{NEW}$ in the storing means 21 suffices. After the object distance is newly set following the temporary shift of the focal length to a longer focal length, the AF action is performed by bringing the focal length back to the previous focal length or by setting it at an arbitrary focal length before a shutter release. This invented arrangement gives an in-focus state without necessitating a continuous current supply to the focusing lens driving motor. This is an advantage in terms of electric energy consumption.

Figure 14:
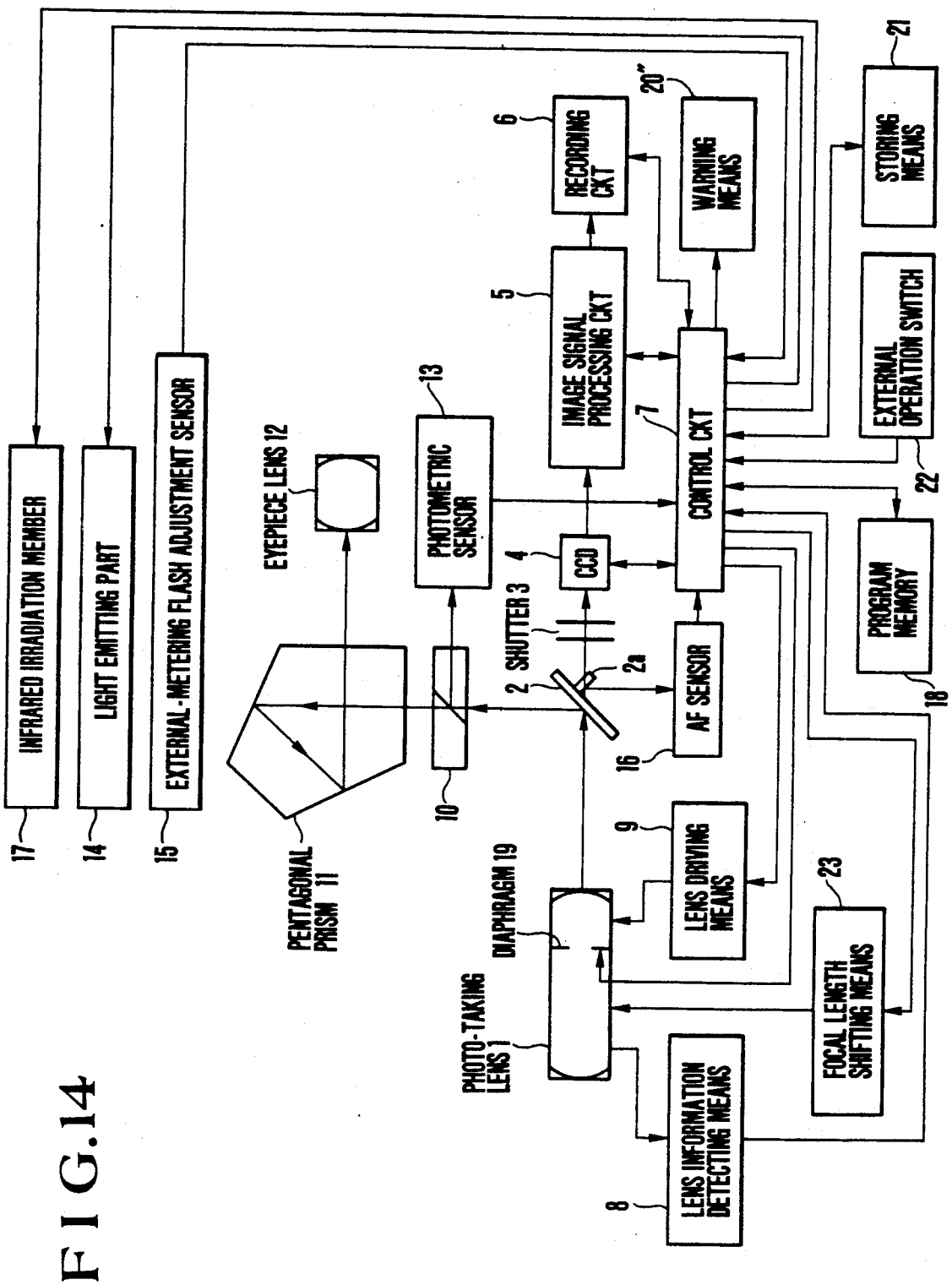
FIG. 14 is a block diagram showing a still further embodiment of the invention.
Figure 15:
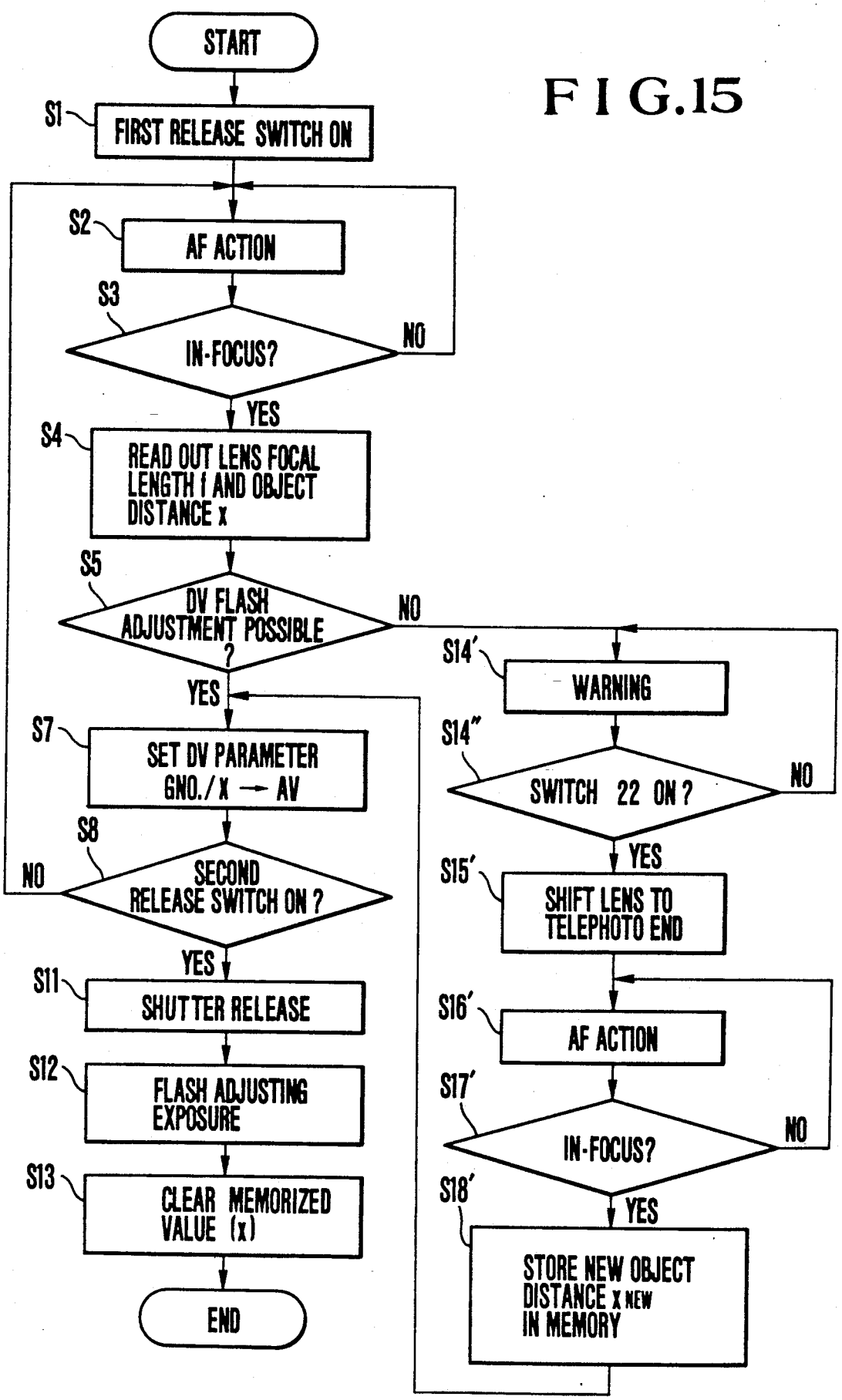
FIG. 15 is a flowchart showing the program of the embodiment shown in FIG. 14.

FIG. 14 shows the arrangement of a still further embodiment of this invention. In FIG. 14, the same component parts as those of the embodiment shown in FIG. 12 are indicated by the same reference numerals. In this case, the camera system includes a focal length shifting means 23 which is arranged to be capable of driving and shifting the focal length of the photo-taking lens 1 up to a telephoto end point. FIG. 15 is a program flowchart showing the operatio,n of the embodiment shown in FIG. 14. In the flowchart, the same parts as those of FIG. 13 are indicated by the same step numbers. Steps S1 to S5, S7, S8 and S11 to S13 are identical with the flow shown in FIG. 13 and, therefore, the details of them are omitted from the following description.

Referring to FIG. 15, if the DV flash adjustment is determined to be impossible at the step S5, the flow comes to a step S14'. At the step S14': The warning means 20" is driven to warn the photographer of the impossibility of the DV flash adjustment according to information on the object distance currently obtained. At a step S14": A check is made to find whether the external operation switch 22 is turned on by the photographer. If the switch 22 is found to be in an on-state, the flow comes to a step S15'. At the step S15': The focal length shifting means 23 comes to operate to shift the photo-taking lens 1 from the current focal length position to a longer focal length position. At a step S16': Again the AF action is performed on the basis of the renewed focal length. At a step S17: A check is made for an in-focus state. Upon confirmation of the in-focus state, the flow comes to a step S18'. At the step S18': A new object distance $x_{NEW}$ which is newly obtained at that time is stored in the storing means 21. The flow then comes to the step S7. Further, when the focal length of the photo-taking lens 1 is shifted at the step S15', the operation of the warning means 20" which has been driven to operate at the step S14' is brought to a stop.

With the flow coming to the step S7 in the above-stated manner, the steps S7, S8 and S11 to S13 are executed to carry out the DV flash adjustment.

While this specific embodiment is arranged to shift the focal length to the telephoto end at the step S15, this arrangement may be changed to shift the focal length to any extent toward the telephoto end until it reaches the DV flash adjustment area without setting any fixed shifting extent.

Further, the embodiment may be arranged to bring the lens either automatically back to its initial focal length position or to an arbitrarily set position, after the object distance has been newly set by temporarily shifting the focal length to a longer focal length.

What is claimed is:

1. A flash photography system having a first mode in which flash photography is carried out by adjusting a flash exposure amount adjusting factor according to a distance to an object to be photographed and a second mode in which flash photography is carried out by adjusting the amount of flash exposure independently of the object distance comprising:
   a) an object distance signal forming circuit for forming an object distance signal indicative of the object distance;
   b) a focal length signal forming circuit for forming a focal length signal indicative of a focal length; and
   c) a change-over circuit, arranged to detect said object distance signal and said focal length signal, for selecting one of said first mode or said second mode according to a combination of said object distance signal and said focal length signal.

2. A system according to claim 1, wherein said object distance signal forming circuit is an automatic focusing circuit.

3. A system according to claim 2, wherein said second mode is a mode in which a flash light emitted from a light emitting part is reflected from the object to be received by a light receiving element and said light emitting part is stopped from emitting light by a light emission control circuit when the quantity of light received by said light receiving element reaches a given quantity.

4. A camera system having an aperture-priority mode in which photographing is performed at an arbitrarily set aperture value and an automatic aperture-setting mode in which photographing is performed at an automatically set aperture value, comprising:
   a) a selecting operation member operabble for selection between said aperture-priority mode and said automatic aperture-setting mode;
   b) an object distance signal forming circuit for forming an object distance signal indicative of a distance to an object to be photographed; and
   c) a flash adjustment control circuit having a first mode in which an aperture value is computed according to said object distance signal and flash photography is caused to be performed at said computed aperture value and a second mode in which a flash light quantity corresponding to said object distance signal is obtained and flash light emission is caused to be effected in said flash light quantity thus obtained, said flash adjustment control circuit being arranged to operate in said second mode when said aperture-priority mode is selected by said selecting operation member and in said first mode when said automatic aperture-setting mode is selected by said selecting operation member.

5. A system according to claim 4, wherein said object distance signal forming circuit is an automatic focusing circuit.

6. A camera system having a first automatic focusing mode in which a shutter release action is inhibited from being performed in response to a release operation until completion of an automatic focusing action performed by an automatic focusing device and a second automatic focusing mode in which a shutter release action is allowed to be carried out, even before completion of said automatic focusing action, in response to a release operation performed before completion of said automatic focusing action, comprising:
  a) an operation member operable for selection between said first and second automatic focusing modes;
  an object distance signal forming circuit for forming, in relation to said automatic focusing action, an object distance signal indicative of a distance to an object to be photographed; and
  c) a flash adjustment control circuit having a first flash adjustment mode in which flash photography is carried out by adjusting a flash exposure amount adjusting factor in accordance with said object distance signal and a second flash adjustment mode in which flash photography is carried out by adjusting the amount of flash exposure independently of the object distance, said flash adjustment control circuit being arranged to be responsive to a mode selection by said operation member and to allow designating said first flash adjustment mode when said first automatic focusing mode is selected and said second flash adjustment mode when said second automatic focusing mode is selected.

7. A system according to claim 6, wherein said second flash adjustment mode is a mode in which a flash light emitted from a light emitting part is reflected from the object to be received by a light receiving element and said light emitting part is stopped from emitting light by a light emission control circuit when the quantity of light received by said light receiving element reaches a given quantity.

8. A flash photography system for performing flash phhotography by adjusting a flash exposure amount adjusting factor inn accordance with an object distance, comprising:
  (a) focusing means for automatically detecting an object distance;
  (b) focal length detecting means for detecting a set focal length of a photo-taking lens; and
  (c) a control circuit for permitting flash photography in which said flash exposure amount adjusting factor is adjusted in accordance with said object distance, when a value representing a combination of the focal length detected by said focal length detecting means and an object distannce detected by said automatic focusing means corresponds to a predetermined combination value.

9. A system according to claim 8, further comprising adjusting means for adjusting the focal length of said photo-taking lens, said adjusting means being arranged to change said focal length when said focal length detected by said focal, length detecting means does not show a predetermined value.

10. A camera havinng a first automatic focusing mode in which a release action is prohibbited until an automatic focusing action is complleted by an automatic focusing device, and a second automatic focusing mode in which the releasing action is permitted before the completion of the automatic focusing action, said camera comprising:
  (a) an object distance signall forming circuit for forming an object distance signal in association with the automatic focusing action;
  (b) a flash controlling circuit for adjusting a flash exposure amount in accordance withh the object distance signal to perform flash photography; and
  (c) a restriction circuit for permitting the flash photography by the flash controlling circuit under the first automatic focusing mode, and prohibiting the flash photography by the flash controlling circuit under the second automatic focusing mode.

11. A flash photography system for adjusting the amount of flash light emitted from a light emitting portion by detecting the amount of flash light reflected by an object to be comprising:
  (a) an object distance signal forming circuit for forming an object distance signal indicative of an object distance;
  (b) a focal length signal forming circuit for forming a focal length signal indicative of a focal length; and
  (c) a control circuit which prohibits the adjustment of the amount of flash light emitted when a combination value of an object distance value indicated by the object distance signal from said object distance signal forming circuit and a focal length value indicated by the focal length signal from said focal length signal forming circuit reaches a predetermined combined value.

* * * * *

UNITED STATES PATENT AND TRADEMARK OFFICE
CERTIFICATE OF CORRECTION

PATENT NO. : 5,017,956

DATED : May 21, 1991

INVENTOR(S) : Yoshitaka MURATA

It is certified that error appears in the above-identified patent and that said Letters Patent is hereby corrected as shown below:

AT SHEET 4:

Figure 4, "SENOR" should read --SENSOR--.

COLUMN 1:

Line 23, "input" should read --been input--.

COLUMN 2:

Line 58, "camera." should read --the camera.--.

COLUMN 3:

Line 1, "parallax" should read --parallax-less--.
    Line 9, "by" should be deleted and "for" should read --far--.
    Line 31, "photographing" should read --photograph--.

COLUMN 4:

Line 3, "shown" should read --shown in Fig. 1.--.
    Line 4, "block diagrams respectively in Fig. 1." should be deleted.
    Line 9, "flowchart" should read --flowcharts--.
    Line 10, "another." should read --another--.
    Line 11, "bodime,nt" should read --bodiment--.
    Line 44, "pr" should read --or--.

COLUMN 6:

Line 9, "accuracY" should read --accuracy--.

UNITED STATES PATENT AND TRADEMARK OFFICE
CERTIFICATE OF CORRECTION

PATENT NO. : 5,017,956    Page 2 of 3
DATED : May 21, 1991
INVENTOR(S) : Yoshitaka MURATA It is certified that error appears in the above-identified patent and that said Letters Patent is hereby corrected as shown below:

COLUMN 7:

Line 34, "ahd" should read --and--.

COLUMN 8:

Line 57, "greatlY" should read --greatly--.
Line 66, "flow chart" should read --flowchart--.

COLUMN 9:

Line 38, "have" should read --has--.

COLUMN 10:

Line 6, "$\pm$" should read --=--.

Line 16, "LDV" should read --$L_{bv}$--.

COLUMN 13:

Line 3, "point" should read --point.--.
Line 6, "flow chart" should read --flowchart--.
Line 32, "steps 53" should read --steps S53--.

COLUMN 14:

Line 61, "xNEW" should read --Xnew--.

UNITED STATES PATENT AND TRADEMARK OFFICE
CERTIFICATE OF CORRECTION

PATENT NO. : 5,017,956
DATED : May 21, 1991
INVENTOR(S) : Yoshitaka MURATA

Page 3 of 3

It is certified that error appears in the above-identified patent and that said Letters Patent is hereby corrected as shown below:

COLUMN 15:

Line 41, "operatio,n" should read --operation--.
Line 61, "step S17:" should read --step S17':--.

COLUMN 16:

Line 24, "distance" should read --distance,--.
Line 51, "operabble" should read --operable--.

COLUMN 18:

Line 8, "distannce" should read --distance--.
Line 15, "focal," should read --focal--.
Line 17, "havinng" should read --having--.
Line 19, "complleted" should read --completed--.
Line 24, "signall" should read --signal--.
Line 28, "withh" should read --with--.
Line 38, "be" should read --be photographed,--.

Signed and Sealed this

Tenth Day of November, 1992

*Attest:*

DOUGLAS B. COMER

*Attesting Officer*     Acting Commissioner of Patents and Trademarks